US006339780B1

(12) United States Patent
Shell et al.

(10) Patent No.: US 6,339,780 B1
(45) Date of Patent: Jan. 15, 2002

(54) LOADING STATUS IN A HYPERMEDIA BROWSER HAVING A LIMITED AVAILABLE DISPLAY AREA

(75) Inventors: Scott R. Shell; Kevin Timothy Shields, both of Redmond; Anthony Kitowitz, Kirkland, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/851,877

(22) Filed: May 6, 1997

(51) Int. Cl.[7] .............................................. G06F 17/00
(52) U.S. Cl. ...................................... 707/526; 707/102
(58) Field of Search ................. 707/1–576; 345/24–440

(56) References Cited

U.S. PATENT DOCUMENTS

| | | | | |
|---|---|---|---|---|
| 4,266,253 A | * | 5/1981 | Matherat ...................... 345/24 |
| 5,467,459 A | * | 11/1995 | Alexander et al. .......... 345/514 |
| 5,731,813 A | * | 3/1998 | O'Rourke et al. .......... 345/349 |
| 5,760,771 A | * | 6/1998 | Blonder et al. ............. 345/302 |
| 5,774,666 A | * | 6/1998 | Portuesi ...................... 709/218 |
| 5,877,766 A | * | 3/1999 | Bates et al. ................. 345/357 |
| 5,973,692 A | * | 10/1999 | Knowlton et al. .......... 345/348 |
| 5,983,005 A | * | 11/1999 | Monteiro et al. ........... 709/231 |
| 6,101,510 A | * | 8/2000 | Stone et al. ................. 707/513 |

OTHER PUBLICATIONS

Smallman et al. "Information availability in 2D and 3D displays", IEEE Computer Graphics and Applications, vol. 21 Issue 5, Sep./Oct. 2001, pp. 51–57.*
Hu et al., "Parameterizable fonts based on shape components", IEEE Computer Graphics and Applications, vol. 21 Issue 3, May/Jun. 2001, pp. 70–85.*
Liu et al., "Web-based peer review: the learner as both adapter and reviewer", Education, IEEE Transactions on, vol. 44 Issue 3, Aug. 2001, pp. 246–251.*
www.sciam.com/200/1100issue/1100stjohnbox1.html.*

* cited by examiner

Primary Examiner—Thomas Black
Assistant Examiner—David Jung
(74) Attorney, Agent, or Firm—Lee & Hayes, PLLC

(57) ABSTRACT

Described herein is a portable computer having a limited display area. An Internet or other hypermedia browser executes on the portable computer to load and display content in a content viewing area. During times when the browser is loading content, the browser displays a temporary, animated graphic element over the content viewing area. The graphic element is removed after the content is loaded, allowing unobstructed viewing of the loaded content.

42 Claims, 3 Drawing Sheets

LOADING STATUS IN A HYPERMEDIA BROWSER HAVING A LIMITED AVAILABLE DISPLAY AREA

TECHNICAL FIELD

This invention relates hypermedia content browsers such as World Wide Web browsers.

BACKGROUND OF THE INVENTION

"Hypermedia" is a metaphor for presenting information in which text, images, sounds, and actions become linked together in a complex, non-sequential web of associations that permit a user to browse through related content and topics, regardless of the presented order of the topics. The term "hypermedia" arises from the similar term "hypertext," which was originally coined to describe the linked text-based documents.

Hypermedia content is widely used for navigation and information dissemination on the "World-Wide Web" (WWW or Web) of the Internet. An application program referred to as a hypermedia browser, hypertext browser, "Web browser" is normally used to retrieve and render hypermedia content from the WWW, although such a browser is also useful for browsing hyperlinked content from other sources.

Hypermedia content is commonly organized as documents with embedded control information. The embedded control information includes formatting specifications, indicating how a document is to be rendered by the Web browser. In addition, such control information can include links or "hyperlinks": symbols or instructions telling the Web browser where to find other related WWW documents. A hyperlink from one hypermedia topic to another is normally established by the author of a hypermedia document, although some applications allow users to insert hyperlinks to desired topics.

A hyperlink is typically rendered by a Web browser as a graphical icon or as highlighted keywords. A user "activates" or "follows" a hyperlink by clicking on or otherwise selecting the icon or highlighted keywords. Activating a link causes the Web browser to load and render the document or resource that is targeted by the hyperlink.

Hyperlink usage is not limited to the Internet. Various multimedia applications and other hypermedia resources utilize hypertext to allow users to navigate through different pieces of information content. For instance, an encyclopedia program might use hyperlinks to provide cross-references to related articles within an electronic encyclopedia. The same program might also use hyperlinks to specify remote information resources such as WWW documents.

Hypermedia browsers have evolved in recent years and are available from several sources. Microsoft's Internet Explorer is one example of a popular browser that is particularly suitable for browsing the WWW and other similar network resources. Browsers such as the Internet Explorer typically have a content viewing area or window, in which textual or other graphical content is displayed. Browser controls such as menus, status displays, and tool icons are located in areas or windows adjacent the viewing area, so that they do not obstruct or interfere with the viewing area.

One persistent characteristic of WWW browsing is that significant delays are often encountered when loading documents and other multimedia content. From the user's perspective, such delays can be quite frustrating. In severe cases involving long delays, users might be inclined to believe that their browsers have become inoperative. To avoid this situation, browsers typically include some type of status display indicating progress in loading content. In many browsers, this consists of a stationary icon such as a flag or globe that becomes animated during periods when content is being loaded. For instance, such an icon might comprise a flag that is normally stationary but that flutters or waves during content loading. An icon such as this is positioned in a tool area or status area outside of the content viewing area. The icon is visible at all times, but is animated only when content is being loaded.

One very recent development relating to this subject is the emergence of a number of popular, small, handheld computing devices that potentially support Internet browsing. These include palmtops, pocket computers, personal digital assistants, personal organizers, and the like. In this disclosure, this class of computing devices is generally referred to as "handheld personal computers", "handheld PCs", or "H/PCs".

One of the most desirable characteristics of H/PCs is their portability. The compact, portable H/PCs provide a user with real computer-like applications—such as email, PIM (personal information management), spreadsheet, and word processing. Hypermedia browsers are among the application programs available for H/PCs. A traveling user can receive email messages, schedule meetings or appointments, and browse the Internet from the H/PC.

To keep H/PCs small, compromises are of course necessary. Chief among the design compromises is an undersized display. Screen space is very limited. Traditional user interface techniques which users are accustomed to on desktop computers are not available for H/PC displays due to the limited size. Additionally, the screen must be efficiently utilized to enable effective data input from the stylus.

With a hypermedia or Internet browser, in particular, there may not be room enough on the available display to implement an animated status display such as described above.

The inventors, however, have developed a method of implementing a status display even within the limited display areas available on popular H/PCs.

SUMMARY OF THE INVENTION

In accordance with the invention, a browser has a content viewing area that is used for displaying graphical hypermedia content. A temporary, animated graphic element is presented in a corner of the content viewing area during times when the browser is loading content. The graphic element is not displayed during any other times.

BRIEF DESCRIPTION OF THE DRAWINGS

The same reference numbers are used throughout the drawings to reference like components and features.

DETAILED DESCRIPTION OF THE PREFERRED EMBODIMENT

Figure 1:
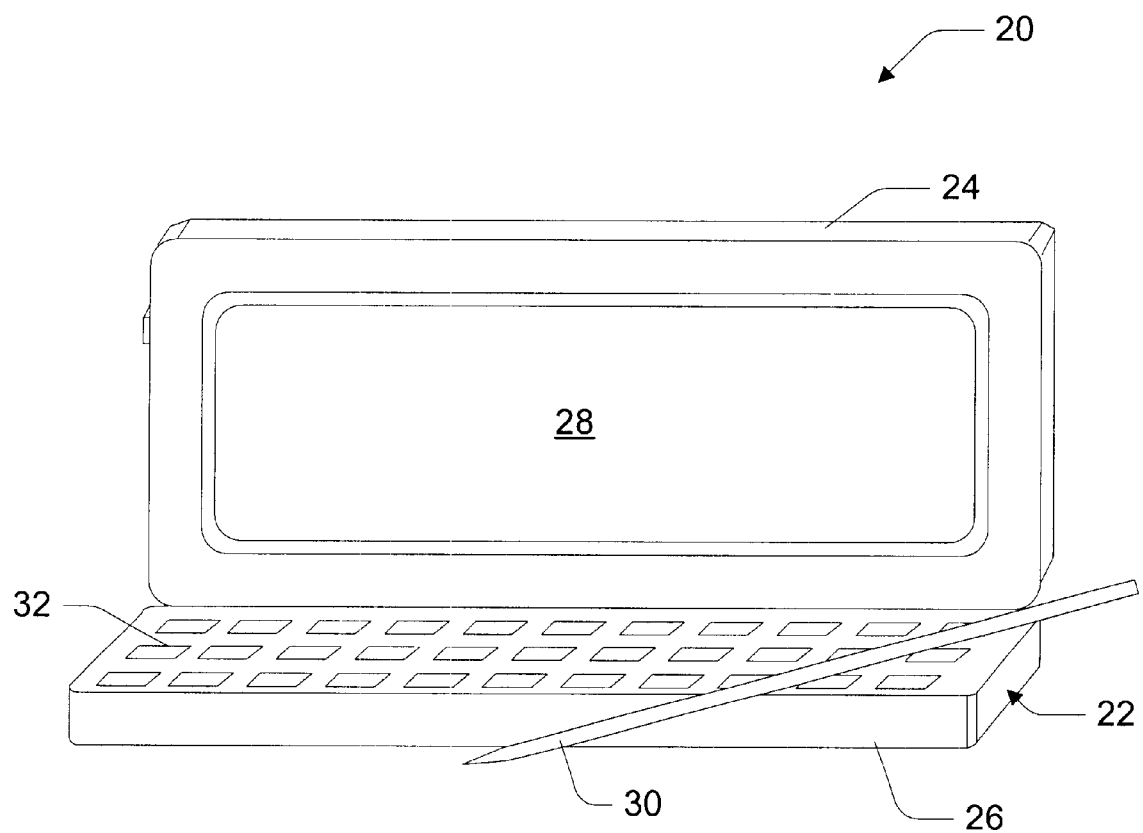
FIG. 1 is a perspective view of a handheld computing device in an open position.

FIG. 1 shows a handheld computing device 20. As used herein, "handheld computing device" means a small computing device having a processing unit that is capable of running one or more application programs, a display, and an input mechanism such as a keypad, a touch-sensitive screen, a track ball, a touch-sensitive pad, a miniaturized QWERTY keyboard, or the like.

The handheld computing device 20 is embodied as a handheld personal computer. The terms "handheld computing device" and "handheld personal computer" (or handheld PC or H/PC) are used interchangeably throughout this disclosure. However, in other implementations, the handheld computing device may be implemented as a personal digital assistant (PDA), a personal organizer, a palmtop computer, a computerized notepad, or the like. The invention can also be implemented in other types of computers and computer-like or computer-controlled devices having graphical display surfaces.

Handheld computing device 20 has a casing 22 with a cover or lid 24 and a base 26. A liquid crystal display (LCD) 28 with a touch-sensitive screen is mounted to lid 24. Lid 24 is hinged to base 26 to pivot between an open position, which exposes display 28, and a closed position, which protects the display. The device is equipped with a stylus 30 to enter data through touchscreen display 28 and a miniature QWERTY keyboard 32. Stylus 30 and keyboard 32 are both mounted in base 26. Although the illustrated implementation shows a two-member H/PC 20 with a lid 24 and a base 26, other implementations of the H/PC might comprise an integrated body without hinged components, as is the case with computerized notepads (e.g., Newton® from Apple Computers).

Figure 2:
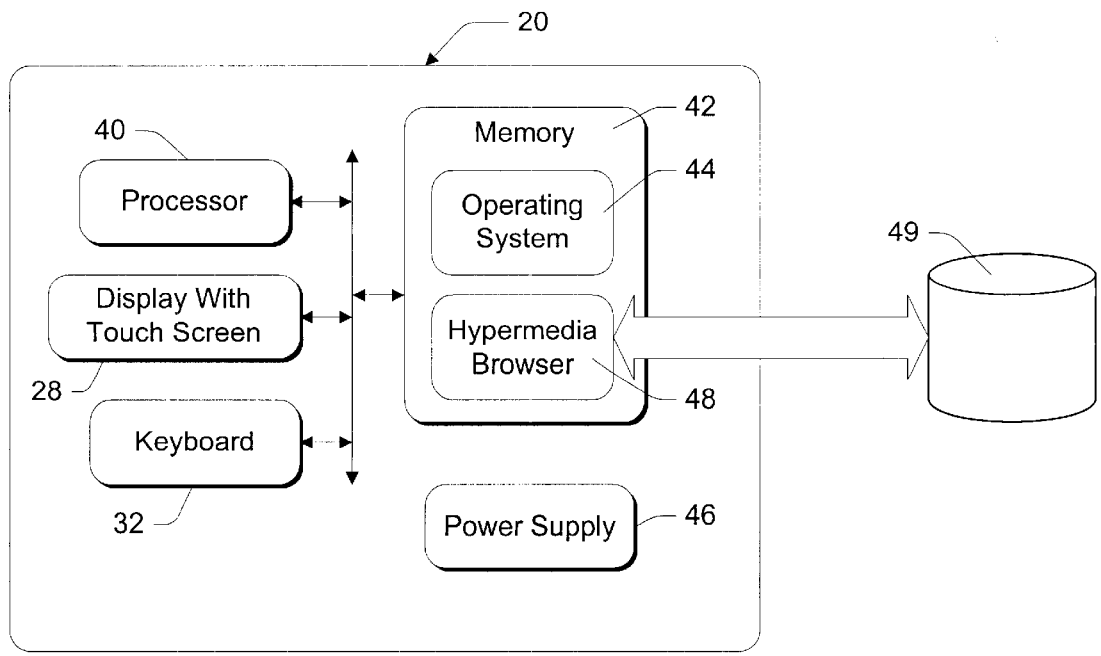
FIG. 2 is a block diagram of the handheld computing device.

FIG. 2 shows functional components of the handheld computing device. It has a processor 40, a computer-readable storage medium or memory 42, a display 28, and a keyboard 32. Memory 42 generally includes both volatile memory (e.g., RAM) and non-volatile memory (e.g., ROM, PCMCIA cards, etc.). The H/PC 20 has a power supply 46 that supplies power to the electronic components. The power supply 46 is preferably implemented as one or more batteries. The power supply 46 might further represent an external power source that overrides or recharges the built-in batteries, such as an AC adapter or a powered docking cradle.

An operating system program 44 is resident in the memory 42 and executes on the processor 40. The operating system 44 is a multitasking operating system that allows simultaneous execution of multiple applications. The operating system employs a graphical user interface windowing environment that presents applications and documents in specially delineated areas of the display screen called "windows." Each window can act independently, including its own menu, toolbar, pointers, and other controls, as if it were a virtual display device. The handheld computing device may be implemented with other types of operating systems that support a graphical user interface.

The operating system 44 is preferably the Windows® CE operating system from Microsoft Corporation that is configured to execute application programs such as application program 48 shown in FIG. 2. The Windows® CE operating system is a derivative of Windows® brand operating systems, such as Windows® 95, that is especially designed for handheld computing devices having limited display areas.

In the described embodiment of the invention, application program 48 is an Internet or other hypermedia browser. The browser is stored as a sequence of program instructions in memory 42, for execution by processor 40. In other embodiments, the browser might be stored on a portable or removable type of computer-readable storage medium such as a floppy disk or EPROM (eraseable read-only memory). As used here, the term "hypermedia browser" refers to an application or application program that is capable of displaying or otherwise rendering hypermedia content and of loading additional or alternative hypermedia content in response to a user's selection of hyperlinks.

Browser 48 has access to a hypermedia resource 49. Often, this resource will be the Internet. However, other sources of hyperlinked content are frequently available and can be efficiently browsed in accordance with the invention. Computer 20 includes a network interface or modem (not shown) for accessing the hypermedia resource.

Figure 3:
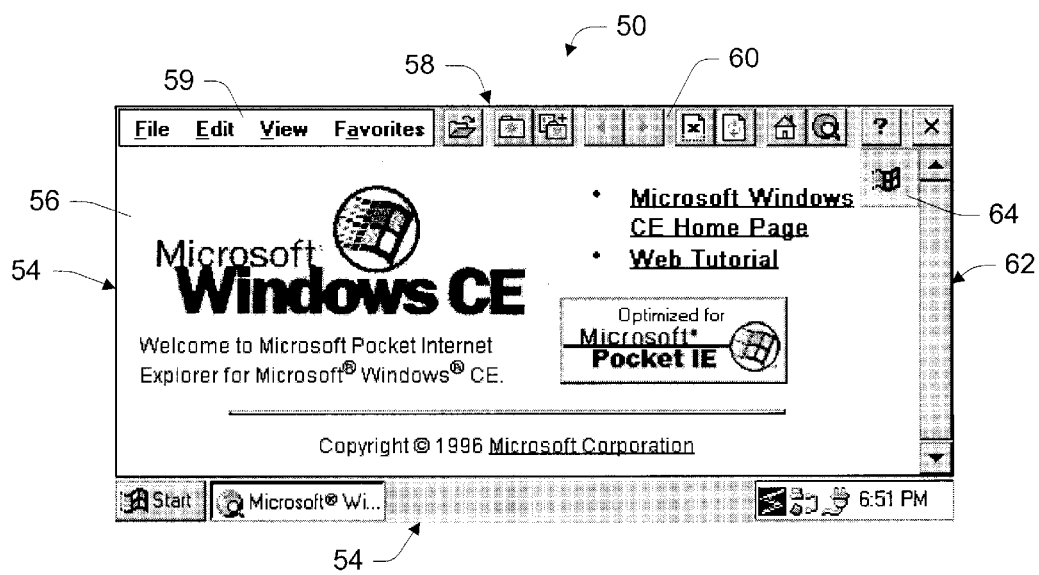
FIGS. 3 and 4 are illustrations of displays generated by a hypermedia browser in accordance with the invention.

FIG. 3 shows an example of a graphical display 50 generated by a hypermedia browser 48 in conjunction with operating system 44. The display includes a number of elements that are generated by making appropriate system calls to the operating system in accordance with well-known protocols. Specifically, Windows® CE supports a subset of the Win32 API set used in the Windows® 95 operating system. These APIs allow an application program to create a variety of on-screen controls with minimal effort.

In this case, the graphical display 50 includes a taskbar 52 presented by the Windows® CE operating system. Browser 48 presents a main window 54, above taskbar 52. Browser main window 54 in this example has three primary components. The largest screen area is dedicated to a content viewing area 56. This is the area in which graphical hypermedia content is displayed.

Content viewing area 56 is bordered along its upper edge by a toolbar 58. Toolbar 58 is similar in appearance to toolbars used in other application programs designed for the Windows® operating environment, with some characteristics that are unique to the Windows® CE environment. One characteristic that is unique to Windows® CE is that the toolbar includes both a menu area 59 and an icon area 60. In previous versions of Windows®, these features were presented within their own distinct areas. Another Windows® CE characteristic is that the toolbar is located on what would have been the "title bar" of previous Windows® application programs. The toolbar thus includes an "X" icon 61 that is used to close the browser application. In previous versions of Windows®, the toolbar would have been below or otherwise separate from the title bar.

A scroll bar 62 borders content viewing area 56 along its right side. Scroll bar 62 is used to vertically scroll the content that is presented in content viewing area 56.

Figure 4:
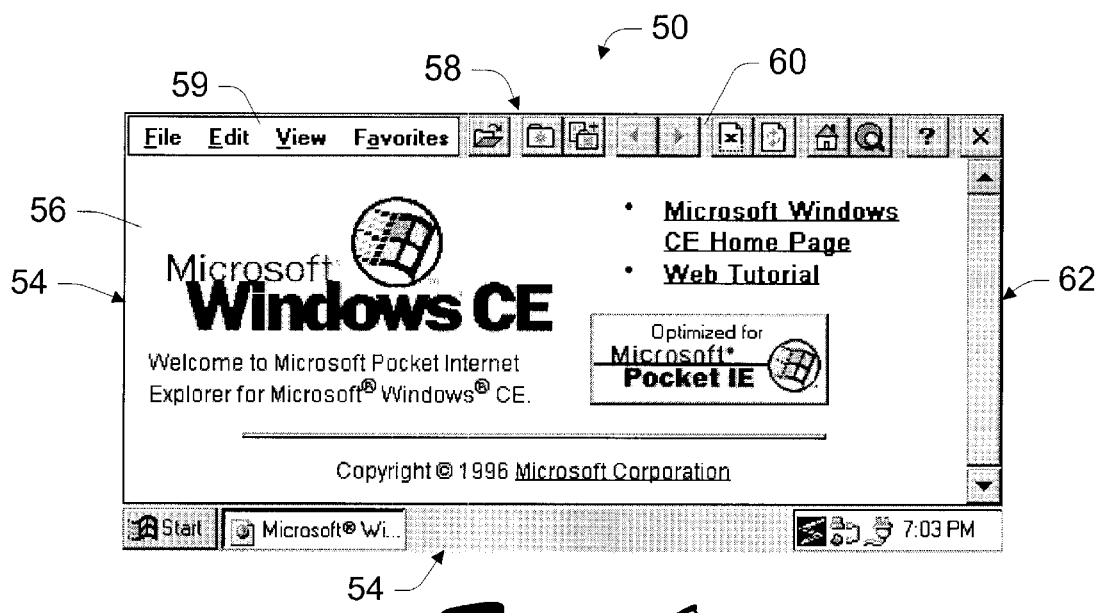

In contrast to prior art hypermedia browsers, browser 48 does not include a permanent "loading status" icon. In fact, no portion of main window 54 is dedicated permanently to displaying loading status. Rather, the browser is configured to display a temporary graphic element 64 over content viewing area 56 during times when the browser is loading content. This temporary graphic element is preferably animated (such as the waving Microsoft® flag shown), and is displayed only when the browser is loading content. It is removed when the browser is not loading content. FIG. 4 shows display 50 after content has been loaded, during a period when no additional content is being loaded. Graphic element 64 has been removed in FIG. 4 because the current Internet page has been completely loaded.

The temporary graphic element is preferably located in a corner of the content viewing area, and obstructs a portion of the viewing area. The upper right corner is preferred because this position is often blank in Internet documents.

The graphic element is created by opening a conventional window in conjunction with the Window® CE windowing operating environment.

This method of displaying loading status achieves the objective of alerting users during periods of time when content is actually being loaded. It does this without requiring a permanent allocation of screen real estate, thus freeing space for other functions. Although there might be some obstruction of hypermedia content, such obstruction is minor and temporary.

The invention has been described primarily in terms of its visual and functional characteristics. However, the invention also includes a method of browsing a hyperlink resource such as the Internet or some other network or data source having linked hypermedia content. The method includes a steps of loading content from the hyperlink resource in response to user selection of hyperlinks contained in said content, and of displaying the content in a content viewing area. The invention also includes a step of displaying a temporary graphic element over the content viewing area during the loading step. The temporary graphic element is removed when content is no longer being loaded.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A hypermedia browser embodied on a computer-readable medium for execution on an information processing device having a limited display area, wherein the hypermedia browser has a content viewing area for viewing content and is configured to display a temporary graphic element over the content viewing area during times when the browser is loading content, wherein the temporary graphic element is positioned over the content viewing area to obstruct only part of the content in the content viewing area, wherein the temporary graphic element is not content and wherein content comprises data for presentation which is from a source external to the browser.

2. A hypermedia browser as recited in claim 1, wherein the browser is configured to display the temporary graphic element over the content viewing area only during times when the browser is loading visible content.

3. A hypermedia browser as recited in claim 1, wherein the temporary graphic element indicates to a user that the browser is loading content.

4. A hypermedia browser as recited in claim 1, wherein the temporary graphic element disappears when the browser's loading of content is complete to indicate to a user that such loading of content is complete.

5. A hypermedia browser as recited in claim 1, wherein the temporary graphic element is animated.

6. A hypermedia browser as recited in claim 1, wherein the hypermedia browser displays the temporary graphic element in a corner of the content viewing area.

7. A hypermedia browser as recited in claim 1, wherein the hypermedia browser presents the temporary graphic element within a temporary window in a windowing operating environment.

8. A hypermedia browser as recited in claim 1, wherein:
   the temporary graphic element is animated; and
   the hypermedia browser presents the temporary graphic element within a temporary window in a windowing operating environment.

9. A hypermedia browser as recited in claim 1, wherein the temporary graphic element conveys status information of the browser.

10. A hypermedia browser of claim 1, wherein content is data formatted for presentation which is selected from a group consisting of visible effects of a markup language, visible text of such a markup language, and visible results of a scripting language.

11. A hypermedia browser of claim 1, wherein content is data formatted for presentation which is selected from a group consisting of HTML, text, SGML, XML, java, XHTML, JavaScript, streaming video, VRML, Active X, Flash. scripting language for the world wide web.

12. An information processing device comprising:
   a processor;
   a display;
   a hypermedia browser executing on the processor to load and display content in a content viewing area on the display;
   wherein the hypermedia browser displays a temporary graphic element over the content viewing area during times when the browser is loading visible content;
   wherein the temporary graphic element is positioned only over a portion of the content viewing area and obstructs only part of the visible content in the content viewing area; and
   wherein the temporary graphic element indicates to a user that the browser is loading content and content comprises data for presentation which is from a source external to the browser.

13. An information processing device as recited in claim 12, wherein the temporary graphic element is animated.

14. An information processing device as recited in claim 12, wherein the hypermedia browser displays the temporary graphic element in a corner of the content viewing area.

15. An information processing device as recited in claim 12, wherein the hypermedia browser displays the temporary graphic element within a temporary window in a windowing operating environment.

16. An information processing device as recited in claim 12, wherein:
   the temporary graphic element is animated; and
   the hypermedia browser displays the temporary graphic element within a temporary window in a windowing operating environment.

17. A hypermedia browser of claim 12, wherein content is data formatted for presentation which is selected from a group consisting of visible effects of a markup language, visible text of such a markup language, and visible results of a scripting language.

18. A hypermedia browser of claim 12, wherein content is data formatted for presentation which is selected from a group consisting of HTML, text, SGML, XML, java, XHTML, JavaScript, streaming video, VRML, Active X, Flash. scripting language for the world wide web.

19. A method of browsing a hyperlink resource, comprising the following steps:
   loading content from the hyperlink resource in response to user selection of hyperlinks contained in said content;
   displaying the content in a content viewing area;
   displaying a temporary graphic element over the content viewing area during the loading step, wherein the temporary graphic element obstructs only part of the content in the content viewing area;
   wherein the loading, the content displaying, and the temporary graphic element displaying steps occur at least partially concurrently; and wherein content comprises data for presentation which is from a source external to the browser.

20. An information processing device as recited in claim 12, wherein the temporary graphic element is not content.

21. An information processing device as recited in claim 12, wherein the temporary graphic element disappears when the browser's loading of content is complete to indicate to a user that such loading of content is complete.

22. A method as recited in claim 19, wherein the temporary graphic element is not content.

23. A method as recited in claim 19, wherein the temporary graphic element indicates to a user that the loading step is being performed.

24. A method as recited in claim 19, further comprising removing the temporary graphic element once the loading step is complete to indicate to a user that the loading step is complete.

25. A method as recited in claim 19, further comprising an additional step of animating the temporary graphic element.

26. A method as recited in claim 19, wherein the displaying step includes displaying the temporary graphic element in a corner of the content viewing area.

27. A method as recited in claim 19, wherein the displaying step includes displaying the temporary graphic element within a temporary window in a windowing operating environment.

28. A method as recited in claim 19, further comprising an additional step of animating the temporary graphic element, wherein the displaying step includes displaying the temporary graphic element within a temporary window in a windowing operating environment.

29. A computer-readable storage medium containing instructions that are executable for performing the steps recited in claim 19.

30. A hypermedia browser of claim 19, wherein content is data formatted for presentation which is selected from a group consisting of visible effects of a markup language, visible text of such a markup language, and visible results of a scripting language.

31. A hypermedia browser of claim 19, wherein content is data formatted for presentation which is selected from a group consisting of HTML, text, SGML, XML, java, XHTML, JavaScript, streaming video, VRML, Active X, Flash. scripting language for the world wide web.

32. A method of indicating a content "load status" of a hypermedia browser having a content viewing area for viewing content, the method comprising:
    displaying loaded content within the content viewing area of a screen of a hypermedia browser, the screen being without a "load status" graphic element, wherein a "load status" graphic element indicates a current content load status of the hypermedia browser;
    receiving an instruction to load new content into the content viewing area;
    loading such new content into the content viewing area; and
    while loading, displaying a "load status" graphic element over the content viewing area so that the graphic element obstructs only part of the content in such content viewing area; and
    wherein content comprises data for presentation which is from a source external to the browser.

33. A method as recited in claim 32 further comprising, upon completion of the loading, removing the "load status" graphic element to reveal the part of the content in the content viewing area that the graphic element obstructed when the element was displayed.

34. A hypermedia browser of claim 32, wherein content is data formatted for presentation which is selected from a group consisting of visible effects of a markup language, visible text of such a markup language, and visible results of a scripting language.

35. A hypermedia browser of claim 32, wherein content is data formatted for presentation which is selected from a group consisting of HTML, text, SGML, XML, java, XHTML, JavaScript, streaming video, VRML, Active X, Flash. scripting language for the world wide web.

36. A computer-readable medium having computer-executable instructions that, when executed by a computer, perform a method of indicating a content "load status" of a hypermedia browser having a content viewing area for viewing content, the method comprising:
    displaying loaded content within the content viewing area of a screen of a hypermedia browser, the screen is without a "load status" graphic element, wherein a "load status" graphic element indicates a current content load status of the hypermedia browser;
    receiving an instruction to load new content into the content viewing area;
    loading such new content into the content viewing area; and
    while loading, displaying a "load status" graphic element over the content viewing area so that the graphic element obstructs only part of the content in such content viewing area; and
    wherein content comprises data for presentation which is from a source external to the browser.

37. A hypermedia browser of claim 36, wherein content is data formatted for presentation which is selected from a group consisting of visible effects of a markup language, visible text of such a markup language, and visible results of a scripting language.

38. A hypermedia browser of claim 36, wherein content is data formatted for presentation which is selected from a group consisting of HTML, text, SGML, XML, java, XHTML, JavaScript, streaming video, VRML, Active X, Flash. scripting language for the world wide web.

39. A computer-readable medium as recited in claim 36 further having additional computer-executable instructions that perform a method comprising, upon completion of the loading, removing the "load status" graphic element to reveal the part of the content in the content viewing area that the graphic element obstructed when the element was displayed.

40. An information processing device comprising:
    a processor;
    a display;
    a hypermedia browser executing on the processor to load and display content in a content viewing area on the display;
    wherein the hypermedia browser is configured to operate in a content-loading mode and a content-loaded mode;
    in the content-loaded mode, the hypermedia browser displays loaded content in the content viewing area and no "load status" graphic element is displayed, wherein absence of such "load status" graphic element indicates that the browser is in the content-loaded mode;
    in the content-loading mode, the hypermedia browser loads content, displays such content in the content viewing area as it loads, and displays a "load status" graphic element over the content view area obstructing part of the content displayed in the content viewing area, wherein presence of such "load status" graphic element indicates that the browser is in the content-loading mode; and wherein content comprises data for presentation which is from a source external to the browser.

41. A hypermedia browser of claim 40, wherein content is data formatted for presentation which is selected from a group consisting of visible effects of a markup language, visible text of such a markup language, and visible results of a scripting language.

42. A hypermedia browser of claim 40, wherein content is data formatted for presentation which is selected from a group consisting of HTML, text, SGML, XML, java, XHTML, JavaScript, streaming video, VRML, Active X, Flash. scripting language for the world wide web.

* * * * *

UNITED STATES PATENT AND TRADEMARK OFFICE
CERTIFICATE OF CORRECTION

PATENT NO.    : 6,339,780 B1
DATED         : January 15, 2002
INVENTOR(S)   : Shell et al.

It is certified that error appears in the above-identified patent and that said Letters Patent is hereby corrected as shown below:

Column 5,
Line 15, change "steps" to -- step --.

Signed and Sealed this

Seventeenth Day of September, 2002

Attest:

JAMES E. ROGAN
Attesting Officer          Director of the United States Patent and Trademark Office